United States Patent
Takahashi (10) Patent No.: US 11,169,684 B2
(45) Date of Patent: Nov. 9, 2021

(54) DISPLAY CONTROL APPARATUSES, CONTROL METHODS THEREFOR, AND COMPUTER READABLE STORAGE MEDIUM

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 16/536,099

(22) Filed: Aug. 8, 2019

(65) Prior Publication Data

US 2019/0361585 A1 Nov. 28, 2019

Related U.S. Application Data

(63) Continuation of application No. PCT/JP2018/004284, filed on Feb. 8, 2018.

(30) Foreign Application Priority Data

Feb. 15, 2017 (JP) .............................. JP2017-026364

(51) Int. Cl.
*G06F 3/0485* (2013.01)
*H04N 5/232* (2006.01)
(Continued)

(52) U.S. Cl.
CPC .......... *G06F 3/0485* (2013.01); *G06F 3/0488* (2013.01); *G06F 3/04842* (2013.01); *H04N 5/232933* (2018.08); *H04N 5/232939* (2018.08)

(58) Field of Classification Search
CPC .. G06F 3/0485; G06F 3/04842; G06F 3/0488; G06F 3/03545; G06F 3/04883;
(Continued)

(56) References Cited

U.S. PATENT DOCUMENTS

| 2010/0125786 A1* | 5/2010 | Ozawa ................ G06F 3/04845 715/702 |
| 2012/0096376 A1* | 4/2012 | Hibi ...................... G06F 3/0485 715/765 |

(Continued)

FOREIGN PATENT DOCUMENTS

| JP | 2012-084063 A | 4/2012 |
| JP | 2013-175214 A | 9/2013 |

(Continued)

*Primary Examiner* — Sinh Tran
*Assistant Examiner* — Zhenzhen Wu
(74) *Attorney, Agent, or Firm* — Canon U.S.A., Inc, IP Division (57) ABSTRACT

A display control apparatus includes a detection unit and a control unit that is configured to perform control to switch a display image to a second image when a first image is displayed and an input position is moved a first amount from a first position in a direction, switch to a third image when the first image is displayed and an input position is moved a second amount from the first position in the direction, switch to the first image in accordance with movement of the input position to the first position without input operation cancellation when the third image is displayed, and switch to the first image when, from a state where switching to the third image is performed, a certain position input is performed without input operation cancellation, even an input operation is cancelled outside a certain range from the first position.

15 Claims, 7 Drawing Sheets (51) Int. Cl.
*G06F 3/0484* (2013.01)
*G06F 3/0488* (2013.01)

(58) Field of Classification Search
CPC ............ G06F 3/0486; H04N 5/232939; H04N 5/232933
See application file for complete search history.

(56) References Cited

U.S. PATENT DOCUMENTS

| | | | |
|---|---|---|---|
| 2012/0165078 A1* | 6/2012 | Mikami | G06F 3/0488 455/566 |
| 2012/0218203 A1* | 8/2012 | Kanki | G06F 3/0416 345/173 |
| 2015/0015507 A1* | 1/2015 | Yoshida | G06F 3/0484 345/173 |
| 2015/0324074 A1* | 11/2015 | Van Winkle | G06F 3/0482 715/776 |

FOREIGN PATENT DOCUMENTS

| | | |
|---|---|---|
| JP | 2015-001902 A | 1/2015 |
| JP | 2016-177560 A | 10/2016 |

\* cited by examiner

DISPLAY CONTROL APPARATUSES, CONTROL METHODS THEREFOR, AND COMPUTER READABLE STORAGE MEDIUM

CROSS-REFERENCE TO RELATED APPLICATIONS

This application is a Continuation of International Patent Application No. PCT/JP2018/004284, filed Feb. 8, 2018, which claims the benefit of Japanese Patent Application No. 2017-026364, filed Feb. 15, 2017, both of which are hereby incorporated by reference herein in their entirety.

TECHNICAL FIELD

The present invention relates to display control apparatuses and display control methods, and more particularly to display control apparatuses and display control methods for when an image to be displayed on a display unit is switched by performing a position input operation on an operation surface.

BACKGROUND ART

Hitherto, there have been a method for switching between images for display by performing an operation for inputting a position on an operation surface, such as a touch operation, an operation for inputting a position in space, and an operation for specifying a position using, for example, infrared light. PTL 1 discloses that when a drag operation is performed after a touch is performed, the amount of movement of a frame is changed in accordance with the amount of movement of the drag operation. In addition, PTL 1 discloses that forward feed is performed when a drag operation is performed toward the right, and backward feed is performed when a drag operation is performed toward the left.

CITATION LIST

Patent Literature

PTL 1 Japanese Patent Laid-Open No. 2013-175214

In the method disclosed in PTL 1, in order to display the previously displayed image after a touch position is moved in one direction, a touch position needs to be moved in the opposite direction by the same distance as moved in the one direction and then the touch needs to be released. In this case, if the amount of movement of the touch position is inaccurate, even a little, an image that the user does not desire may be displayed. Thus, the user needs to move the touch position accurately, so it may take time to adjust the touch position or the user needs to operate carefully. Thus, it is not easy to display the previous image.

SUMMARY OF INVENTION

The present invention has been made in light of the above-described problems, and the operability of a display control apparatus at the time of switching an image to be displayed can be improved by moving an input position through an operation performed on an operation surface.

The present invention provides a display control apparatus including a detection unit configured to detect an input operation for inputting a position, and a control unit configured to perform control to switch an image to be displayed on a display unit in accordance with an amount of movement of an input position based on an input operation detected by the detection unit. The control unit is configured to perform control to switch an image to be displayed on the display unit to a second image in a case where a first image is displayed on the display unit, an input position is started from a first position, and the input position is moved a first amount in a first direction, switch the image to be displayed on the display unit to a third image, which is further than the second image, in a case where the first image is displayed on the display unit, an input position is started from the first position, and the input position is moved a second amount, which is larger than the first amount, in the first direction, switch the image to be displayed on the display unit to the first image in accordance with movement of the input position to the first position, from a state in which the third image is displayed, without cancellation of the input operation, by which the third image is displayed and which is moved the second amount from the first position, and switch the image to be displayed on the display unit to the first image in a case where, from a state in which switching to the third image is performed, a position input, which satisfies a predetermined condition, is performed without cancellation of the input operation, by which the third image is displayed and which is moved the second amount from the first position, even the input operation is cancelled outside a range of the first amount from the first position.

Further features of the present invention will become apparent from the following description of exemplary embodiments with reference to the attached drawings.

DESCRIPTION OF EMBODIMENTS

In the following, exemplary embodiments of the present invention will be described in detail with reference to the attached drawings. Note that, for example, the dimensions and forms of components illustrated by example in the present exemplary embodiment and the relative arrangement of the components are changed as necessary depending on the configuration of an apparatus to which the present invention is applied and various conditions, and the present invention is not limited to these examples.

Figure 1:
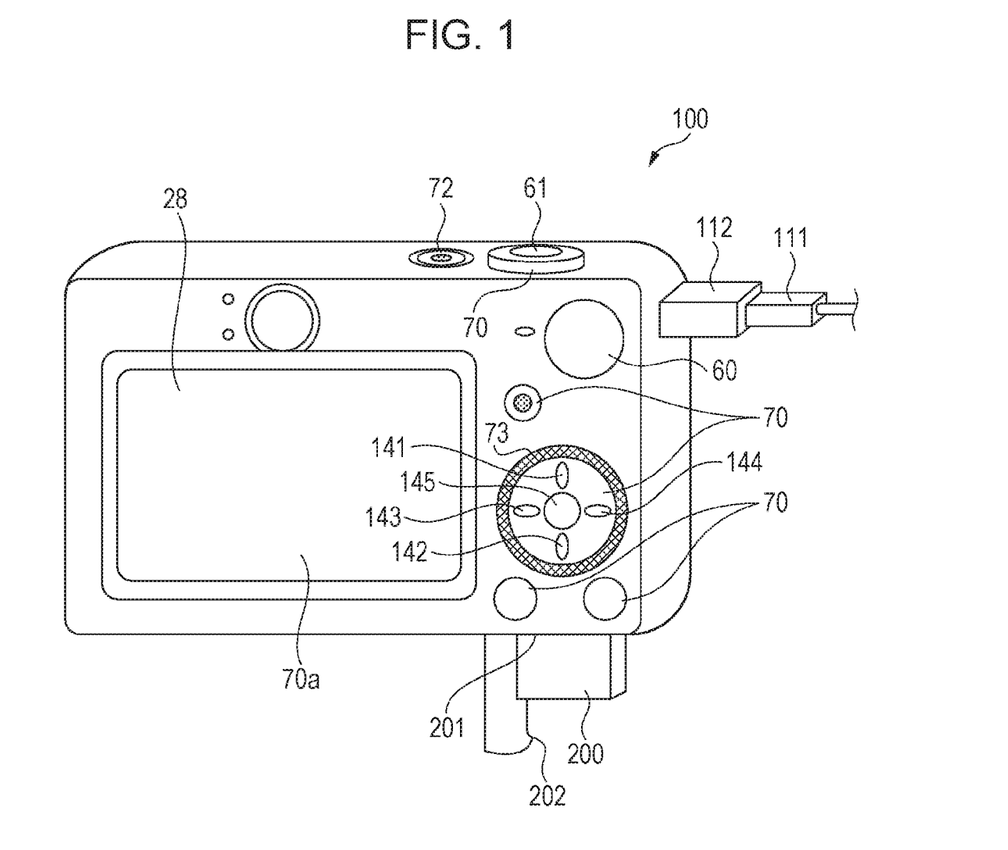
FIG. 1 is a diagram illustrating an example of an external view of an image capturing apparatus according to a present exemplary embodiment.

FIG. 1 illustrates an external view of a digital camera 100 as an example of an apparatus to which the present exemplary embodiment can be applied. A display unit 28 displays images and various types of information. A touch panel 70a is a touch panel that can accept touch operations performed on a display surface of the display unit 28. The touch panel 70a and the display unit 28 may be provided integrally or may be superposed with each other. A shutter button 61 is a button for issuing an image capturing command and has a configuration of a two-stage switch. As described later, when the shutter button 61 is half-pressed, a command to prepare for image capturing is issued, and when the shutter button 61 is fully pressed, a command to capture an image is issued. A mode selector switch 60 is used to switch between various modes. An operation unit 70 includes operation members such as various switches, buttons, and a touch panel for receiving various operations performed by the user.

The operation unit 70 includes a SET button 145, a controller wheel 73, and directional keys 141 to 144 in addition to the touch panel 70a.

The controller wheel 73 is an operation member that allows rotation operations and that is included in the operation unit 70, and is used together with the directional keys 141 to 144 to, for example, specify a selection item. When the controller wheel 73 is operated by being rotated, an electrical pulse signal corresponding to an operation amount is generated. A system control unit 50 controls various units of the digital camera 100 on the basis of this pulse signal. On the basis of the pulse signal, a degree by which the controller wheel 73 has been rotated and operated and the number of revolutions the controller wheel 73 has made can be determined. Note that the controller wheel 73 may be any operation member as long as rotation operations can be detected. For example, a dial operation member may also be used with which the controller wheel 73 itself rotates and generates a pulse signal in accordance with a rotation operation performed by the user. In addition, an operation member (a so-called touch wheel) including a touch sensor may also be used with which the controller wheel 73 itself does not rotate and, for example, a rotation operation performed by the user's finger is detected on the controller wheel 73.

The directional keys 141 to 144 are an up key 141, a down key 142, a left key 143, and a right key 144 indicating the directions. When the SET button 145 is pressed, for example, a menu item or a setting value indicated by the cursor on the display unit 28 can be selected. A power switch 72 is a push button for switching between the power-on and power-off states.

A connector 112 is used to connect the digital camera 100 and an external device such as a personal computer or a printer to each other via a connection cable 111. A recording medium 200 is, for example, a memory card or a hard disk, and is stored in a recording medium slot 201. The recording medium 200 stored in the recording medium slot 201 can communicate with the digital camera 100, and can perform recording and playback. The recording medium slot 201 is usually covered by a lid 202. FIG. 1 illustrates a state in which the lid 202 is open and a portion of the recording medium 200 is ejected from the recording medium slot 201 and exposed.

Figure 2:
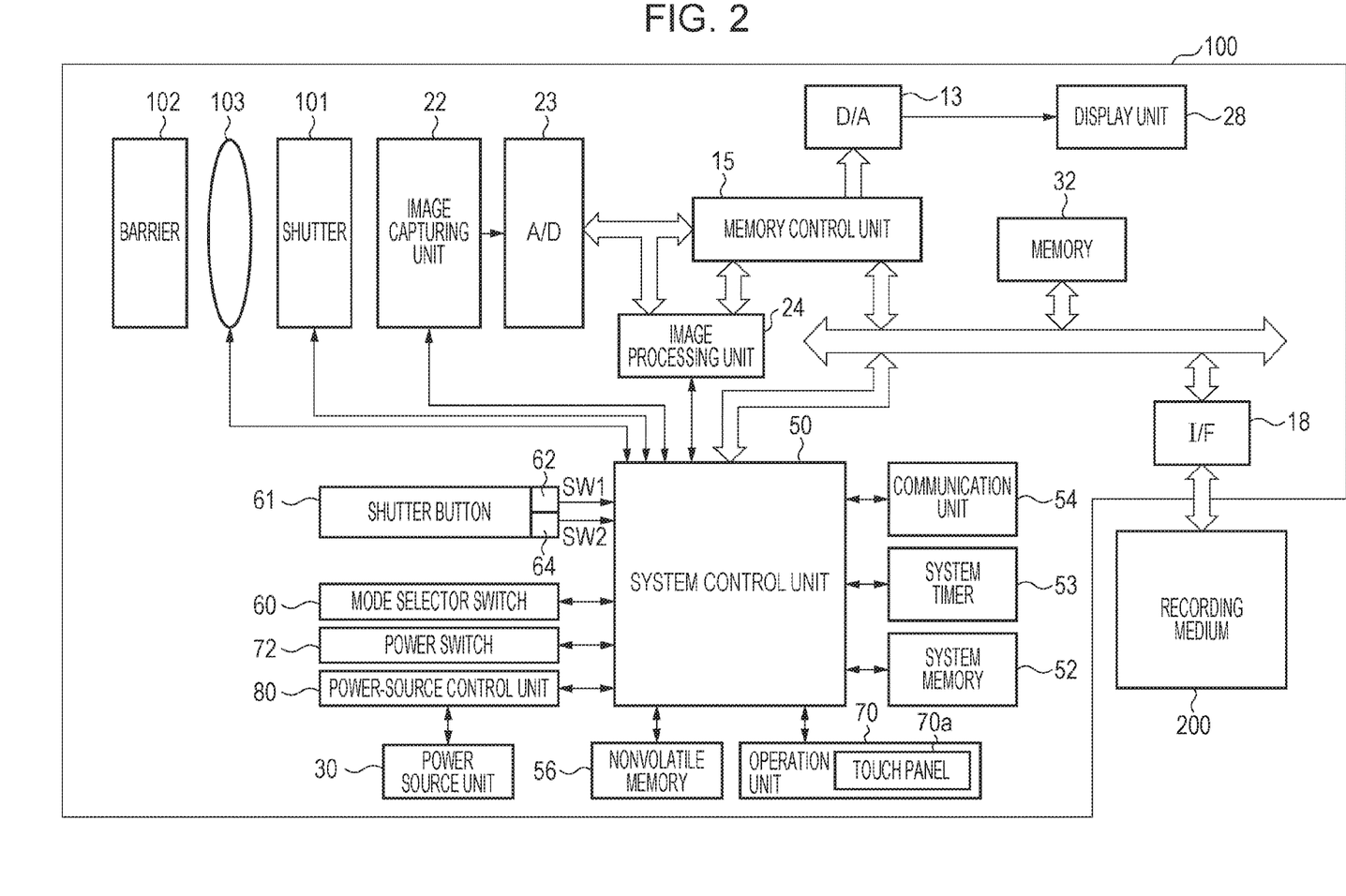
FIG. 2 is a block diagram illustrating the configuration of the image capturing apparatus according to the exemplary embodiment.

FIG. 2 is a block diagram illustrating an example of the configuration of the digital camera 100 according to the present exemplary embodiment. In FIG. 2, a picture-taking lens 103 is represented as a single lens; however, the picture-taking lens 103 is a group of lenses composed of a plurality of lenses such as a zoom lens and a focus lens. A shutter 101 has an aperture function. An image capturing unit 22 is an image pickup element including, for example, a charge-coupled device (CCD) or a complementary metal-oxide-semiconductor (CMOS) device that converts, into an electrical signal, an optical image entering via the picture-taking lens 103 and the shutter 101. An analog-to-digital (A/D) converter 23 converts an analog signal output from the image capturing unit 22 into a digital signal. A barrier 102 prevents an image capturing system from being dirty and broken by covering the image capturing system, the image capturing system including the picture-taking lens 103, the shutter 101, and the image capturing unit 22 of the digital camera 100.

An image processing unit 24 performs certain pixel interpolation processing, resizing processing such as reduction, and color conversion processing on data from the A/D converter 23 and data from a memory control unit 15. In addition, the image processing unit 24 performs certain arithmetic processing using image data output from the A/D converter 23, and the system control unit 50 performs exposure control and focus adjustment control on the basis of an acquired arithmetic operation result. As a result, through the lens (TTL) autofocus (AF) processing, TTL automatic exposure (AE) processing, and pre-flash processing using a TTL enabled flash (EF) are performed. Furthermore, the image processing unit 24 performs certain arithmetic processing using image data output from the A/D converter 23, and also performs TTL auto white balance (AWB) processing on the basis of an acquired arithmetic operation result.

Output data from the A/D converter 23 is written into a memory 32 via the image processing unit 24 and the memory control unit 15 or via the memory control unit 15. The memory 32 stores digital image data into which image data acquired by the image capturing unit 22 is converted by the A/D converter 23, and image data for performing display at the display unit 28. The memory 32 has a sufficient storage capacity for storing a predetermined number of still images and a predetermined time period of motion image and its audio data.

In addition, the memory 32 also functions as an image-display memory (video memory). A digital-to-analog (D/A) converter 13 converts data for image display stored in the memory 32 into an analog signal and supplies the analog signal to the display unit 28. In this manner, image data for performing display written into the memory 32 is displayed on the display unit 28 via the D/A converter 13. The display unit 28 is a display device such as a liquid crystal display (LCD) and performs display in accordance with an analog signal from the D/A converter 13. In this manner, a digital signal obtained by performing A/D conversion using the A/D converter 23 and stored in the memory 32 is converted into an analog signal by the D/A converter 13, and display is performed by transferring the analog signal to the display unit 28 as needed. As a result, through-the-lens image display (live view image display) can be performed at the display unit 28.

A nonvolatile memory 56 is an electrically erasable and recordable recording medium, and, for example, an electrically erasable programmable read only memory (EEPROM) is used. For example, constants, variables, and programs for operation of the system control unit 50 are stored in the nonvolatile memory 56. In this case, the programs include computer programs for executing various flow charts to be described later in the present exemplary embodiment.

The system control unit 50 is a control unit including at least one processor, and controls the entirety of the digital camera 100. Various pieces of processing according to the present exemplary embodiment to be described later are realized by executing programs recorded on the nonvolatile memory 56 described above. A random-access memory (RAM) is used in a system memory 52, and the constants and variables for operation of the system control unit 50 and the programs read out from the nonvolatile memory 56 are loaded into the system memory 52. In addition, the system control unit 50 also performs display control by controlling, for example, the memory 32, the D/A converter 13, and the display unit 28. A system timer 53 is a timer unit that measures time periods for performing various types of control and a time period of a built-in clock.

The mode selector switch 60, the shutter button 61, and the operation unit 70 are operation units for inputting various operation commands to the system control unit 50.

The mode selector switch 60 switches the operation mode of the system control unit 50 to, for example, one of a still-image recording mode, a moving-image capturing mode, and a playback mode. As modes included in the still-image recording mode, for example, there are an automatic image capturing mode, an automatic scene determination mode, a manual mode, an aperture-priority mode (Av mode), and a shutter-priority mode (Tv mode). In addition, for example, there are various scene modes, a program AE mode, and a custom mode, which are image capturing settings on an image capturing scene basis. By using the mode selector switch 60, the operation mode of the system control unit 50 can be directly switched to one of these modes. Alternatively, switching to a screen displaying a list of image capturing modes is once performed using the mode selector switch 60, and thereafter one of a plurality of displayed modes may be selected and mode switching may be performed by using another operation member. Likewise, the moving-image capturing mode may also include a plurality of modes.

A first shutter switch 62 is turned on when the shutter button 61 provided at the digital camera 100 is being operated, that is, so-called half-pressed (image-capturing preparation command), and generates a first shutter switch signal SW1. The system control unit 50 starts an operation such as AF processing, AE processing, AWB processing, and EF processing in accordance with the first shutter switch signal SW1. A second shutter switch 64 is turned on when the operation of the shutter button 61 is completed, that is, so-called fully pressed (an image capturing command), and generates a second shutter switch signal SW2. The system control unit 50 starts, in accordance with the second shutter switch signal SW2, a series of pieces of image capturing processing starting from reading out of a signal from the image capturing unit 22 to writing image data into the recording medium 200.

Functions are allocated to the various operation members of the operation unit 70 as necessary on a scene-by-scene basis by performing, for example, a selection operation on various function icons displayed on the display unit 28, and the selected icons operate as various function buttons. As the function buttons, for example, there are an end button, a return button, an image forward button, a jump button, a narrowing-down button, and an attribute change button. For example, when a menu button is pressed, a menu screen through which various types of settings can be set is displayed on the display unit 28. The user can intuitively set various types of setting by using the menu screen displayed on the display unit 28, the directional keys 141 to 144, which are four directional buttons for up, down, left, and right, and the SET button 145.

A power-source control unit 80 includes, for example, a battery detection circuit, a direct-current-to-direct-current (DC-DC) converter, a switching circuit that performs switching to a block to which power is to be applied, and detects whether a battery is connected, the type of battery, and the remaining battery level. In addition, the power-source control unit 80 controls the DC-DC converter on the basis of the detection result and a command from the system control unit 50, and applies a necessary voltage to various units including the recording medium 200 for a necessary period of time.

A power source unit 30 includes, for example, a primary battery such as an alkaline battery or a lithium battery, a secondary battery such as a nickel-cadmium (NiCd) battery, a nickel metal hydride (NiMH) battery, or a lithium (Li) battery, and an alternating current (AC) adapter. A recording medium interface (I/F) 18 is an interface for the recording medium 200, examples of which are a memory card and a hard disk. The recording medium 200 is a recording medium such as a memory card for recording captured images, and is composed of a semiconductor memory, an optical disc, a magnetic disk, or the like. The power switch 72 is as described using FIG. 1.

A communication unit 54 is wirelessly connected or connected in a wired manner with a cable, and performs transmission and reception of an image signal, an audio signal, and so on. The communication unit 54 can also be connected to a wireless local-area network (LAN) and the Internet. The communication unit 54 can transmit images captured by the image capturing unit 22 (including through-the-lens images) and images recorded on the recording medium 200 to external devices, and can also receive image data and various other types of information from the external devices.

In the present exemplary embodiment, the operation unit 70 described above has, as a portion thereof, the touch panel 70a, through which contact with the display unit 28 can be detected. As the touch panel 70a, any touch panel may be used among touch panels using various methods such as a resistive film method, a capacitive sensing method, a surface acoustic wave method, an infrared method, an electromagnetic induction method, an image recognition method, and an optical sensing method. Depending on the method, it is detected that a touch has been performed when something is in contact with a touch panel or when the user's finger or pen is in close vicinity to a touch panel; however, any method may be used.

The touch panel 70a and the display unit 28 may be formed integrally. For example, the touch panel 70a is configured to have light transmittance such that display performed by the display unit 28 is not disturbed. The touch panel 70a is attached to an upper layer of a display surface of the display unit 28, and associates input coordinates on the touch panel 70a with display coordinates on the display unit 28. As a result, a graphical user interface (GUI) can be configured that allows the user to perform an operation as if the user directly operates the screen displayed on the display unit 28. The system control unit 50 can detect the following operations performed on the touch panel 70a or the following states (a touch can be detected).

The user's finger or pen that has not touched the touch panel 70a newly touches the touch panel 70a. In other words, the start of a touch. In the following, it is called "Touch-Down".

A state in which the user's finger or pen is touching the touch panel 70a. In the following, it is called "Touch-On".

The user's finger or pen is moving on the touch panel 70a while touching the touch panel 70a. In the following, it is called "Touch-Move".

The user's finger or pen touching the touch panel 70a has been moved away from the touch panel 70a. In other words, the end of a touch. In the following, it is called "Touch-Up".

A state in which nothing is touching the touch panel 70a. In the following, it is called "Touch-Off".

When Touch-Down is detected, Touch-On is also detected simultaneously. After Touch-Down, Touch-On is usually continuously detected unless Touch-Up is detected. Touch-Move is detected in a state in which Touch-On is detected. Even when Touch-On is detected, if a touch position is not moved, Touch-Move is not detected. After Touch-Up is detected for all things that have been touching the touch panel 70a such as the user's finger or pen, Touch-Off is detected.

The system control unit 50 is notified of these operations and states and position coordinates of the position on the touch panel 70a that the user's finger or pen is touching, through an internal bus. The system control unit 50 determines, on the reported information, what operation (touch operation) has been performed on the touch panel 70a. Regarding Touch-Move, the direction in which the user's finger or pen moves on the touch panel 70a can also be determined on the basis of changes in position coordinates on a vertical component basis and on a horizontal component basis on the touch panel 70a. In a case where Touch-Move is detected at least a predetermined distance, it is determined that a slide operation has been performed. An operation in which the user's finger or pen is quickly moved some distance on the touch panel 70a while touching the touch panel 70a and then is simply moved away from the touch panel 70a is called a flick. In other words, a flick is an operation for moving the user's finger quickly along the surface of the touch panel 70a such that the touch panel 70a is stricken lightly with his or her finger. When it is detected that Touch-Move is performed at least a predetermined distance at least a predetermined speed and then Touch-Up is detected, it can be determined that a flick has been performed. That is, it can be determined that, subsequent to a slide operation, a flick is performed.

Furthermore, when a plurality of positions (for example, two positions) are touched simultaneously, an operation for bringing the touch positions close to each other is called a pinch-in operation and an operation for locating the touch positions away from each other is called a pinch-out operation. The pinch-out operation and the pinch-in operation are collectively called pinch operations.

Next, processing performed in a playback mode in the present exemplary embodiment will be described with reference to flow charts illustrated in FIGS. 3 to 4 and FIGS. 5A to 5M. Pieces of processing performed in these flow charts are realized by the system control unit 50 loading the programs stored in the nonvolatile memory 56 into the memory 32 and executing the programs. In this case, an example will be described in which a return to the image displayed before image switching is performed in a case where the return button is operated or in a case where jump feed is performed by performing Touch-Down in a predetermined area and performing Touch-Move in a predetermined direction and then a predetermined operation is performed while the touch is being continued.

Figure 5A:
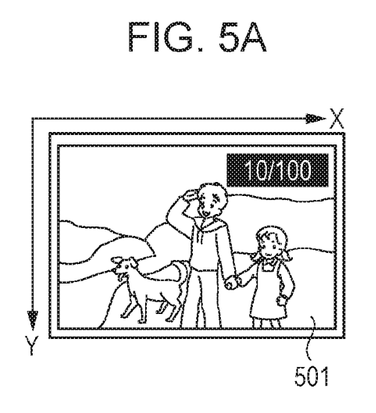
FIG. 5A is a diagram illustrating an example of display at a display unit according to the exemplary embodiment.

In S101, the system control unit 50 reads an image 501 from the recording medium 200 and displays the image 501 on the display unit 28 in a full-screen mode (FIG. 5A). The process proceeds to S102. In S102, the system control unit 50 determines whether the start of a touch (Touch-Down) is detected. In a case where Touch-Down is detected, the process proceeds to S103, and in a case where no Touch-Down is detected, the process proceeds to S114.

Figure 5B:
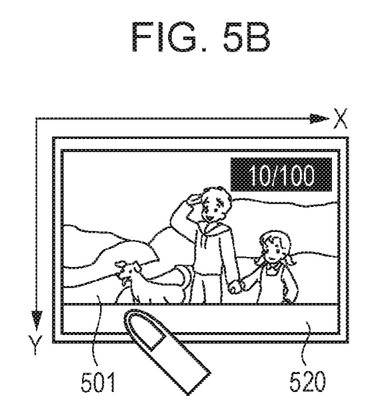
FIG. 5B is a diagram illustrating an example of display at the display unit according to the exemplary embodiment.

In S103, the system control unit 50 stores, in the memory 32, a position at which the Touch-Down is detected as touch-start coordinates (Xo, Yo). The process proceeds to S104. In S104, the system control unit 50 determines whether the Touch-Down has been performed in a predetermined region. As the predetermined region, for example, a region (Yo≥Yc) corresponding to a GUI bar 520 illustrated in FIG. 5B is considered on a screen as illustrated in FIG. 5A. In this case, it is determined whether the touch-start coordinates (Xo, Yo) are present in the predetermined region corresponding to the GUI bar 520. In a case where the Touch-Down is performed in the predetermined region, the process proceeds to S105. In a case where it is determined that the touch is started in a region outside the predetermined region, the process proceeds to S108.

In S105, the system control unit 50 displays the GUI bar 520 on the display unit 28 as illustrated in FIG. 5B. In this manner, by displaying the GUI bar 520, it is indicated to the user that jump feed can be executed by performing Touch-Move on the GUI bar 520. Thereafter the process proceeds to S106, and the system control unit 50 stores, in the memory 32, information regarding the image 501 (FIG. 5A), which is displayed at the time of display of the GUI bar 520, that is, at the time of initiating a touch for Touch-Move for image switching. That is, when Touch-Move is performed on the GUI bar 520, an image to be displayed can be switched, and the image that is originally displayed before the image switching due to the Touch-Move is recorded in the memory 32. The information regarding the image 501 in this case refers to, for example, thumbnail data, an image number, and EXIF information of the image 501. Thereafter the process proceeds to S107, and jump feed processing to be described later is performed.

Figure 5C:
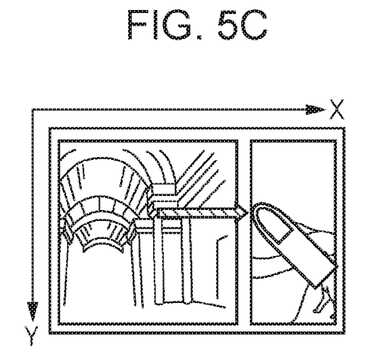
FIG. 5C is a diagram illustrating an example of display at the display unit according to the exemplary embodiment.
Figure 5D:
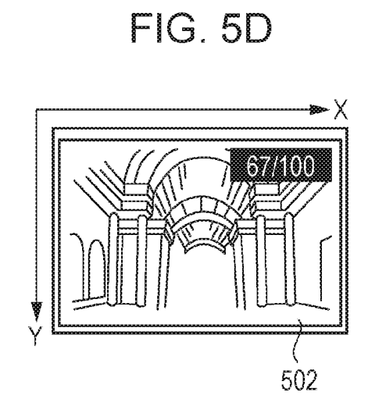
FIG. 5D is a diagram illustrating an example of display at the display unit according to the exemplary embodiment.

In contrast, in a case where it is determined in S104 that a touch is started in a region outside the predetermined region, the system control unit 50 determines in S108 whether movement of the touch position (Touch-Move) is detected. In the case where it is determined in S104 that a touch is started outside the predetermined region, processing for one-image feed is performed. In a case where Touch-Move is detected in S108, the process proceeds to S109. In a case where no Touch-Move is detected in S108, the process proceeds directly to S110. In S109, the system control unit 50 acquires current touch position coordinates (X, Y) after the Touch-Move, stores the touch position coordinates (X, Y) in the memory 32, and moves the image in accordance with the direction of the Touch-Move (FIG.

5C). The process then proceeds to S110. In this case, a portion of the previous or next image appears on the display unit 28 while the previous or next image and the image that is originally displayed are being moved together.

In S110, the system control unit 50 determines whether Touch-Up is detected. In a case where Touch-Up is detected, the process proceeds to S111. In a case where no Touch-Up is detected, the process returns to S108.

In S111, the system control unit 50 determines whether an X component of the current touch position after the Touch-Move has been moved more than a predetermined distance XA from the Touch-Down position. That is, whether |X−Xo|>XA is determined. In a case where it is determined that the X component of the current touch position has been moved the predetermined distance XA, the process proceeds to S112. In S112, the system control unit 50 performs image switching in accordance with the direction of the movement such that the image (for example, an image 502 in FIG. 5D) that is either previous or subsequent to the image (FIG. 5A) displayed at the time of performance of the Touch-Down. The process then returns to S102.

In contrast, in a case where the X component of the current touch position has been moved the predetermined distance XA or less (|X−Xo|≤XA), the system control unit 50 displays in S113, on the basis of the information regarding the image stored in S106, the image (FIG. 5A) displayed at the time of performance of the Touch-Down. The process returns to S102.

In S114, the system control unit 50 determines whether to end the playback mode. In a case where it is determined to end the playback mode, the playback mode ends. In a case where it is determined not to end the playback mode, the process returns to S102.

Figure 4:
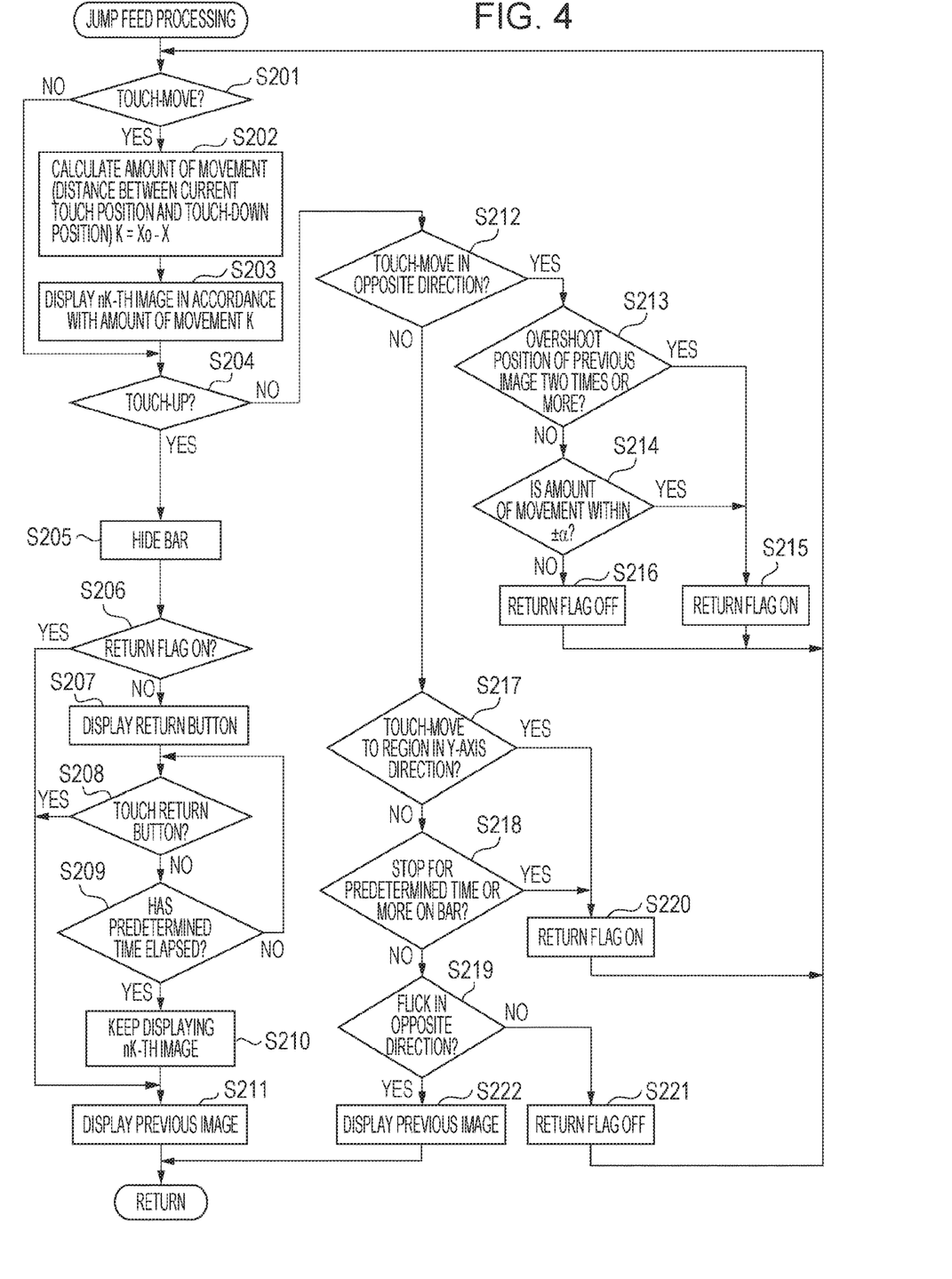
FIG. 4 is a flow chart illustrating jump feed processing according to the exemplary embodiment.

FIG. 5 is a flow chart illustrating jump feed processing performed in S107 in FIG. 4. In S201, the system control unit 50 determines whether Touch-Move taking place in the X-axis direction (plus or minus) is detected in the region of the GUI bar 520. In a case where Touch-Move in the X-axis direction is detected in the region of the GUI bar 520, the process proceeds to S202. In a case where no such Touch-Move is detected, the process proceeds directly to S204.

In S202, the system control unit 50 calculates the amount of movement K (K=Xo−X), which is the distance between the current touch position and the Touch-Down position in the X-axis direction. The process proceeds to S203. In a case where Touch-Move is detected for the first time in S201 after Touch-Down is performed in S102, the direction of the Touch-Move and the coordinates of the touch-start position acquired in S103 are recorded in the memory 52.

Figure 5E:
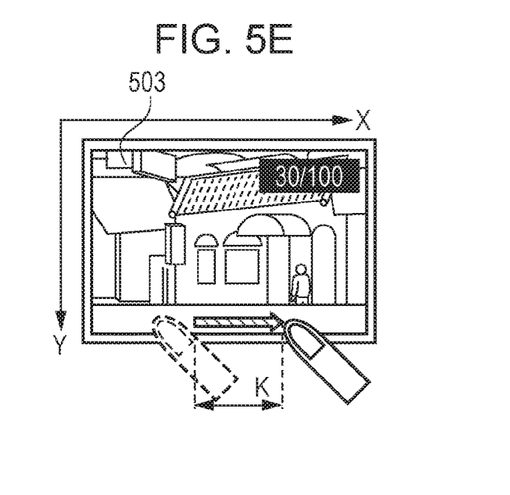
FIG. 5E is a diagram illustrating an example of display at the display unit according to the exemplary embodiment.

In S203, the system control unit 50 displays, on the display unit 28, an image located a certain number of images after or before the image displayed at the time of performance of the Touch-Down, the certain number corresponding to the amount of movement K. For example, in a case where an image number of the image displayed at the time of performance of the Touch-Down is 10, the image at a target position corresponding to a Touch-Move distance can be expressed using 10+nK, and a (10+nK)-th image (for example, an image having an image number of 30) is displayed on the display unit 28 (FIG. 5E). In this case, the value of n may be a numerical value such as 5 (images/cm) or 0.4 (images/mm). In a case where the user wants to jump many images with respect to the amount of movement of a touch, the value of n is set to a large value. In a case where Touch-Move is performed in the plus direction in the X-axis direction, the amount of movement K has a minus value and an image prior to the image displayed at the time of performance of the Touch-Down in a sequence (in display order of the recording medium 200) is displayed. In contrast, in a case where Touch-Move is performed in the minus direction in the X-axis direction, the amount of movement K has a plus value and an image after the image displayed at the time of performance of the Touch-Down in the sequence is displayed.

In S204, the system control unit 50 determines whether a touch release operation (Touch-Up) is detected. In a case where Touch-Up is detected, the process proceeds to S205. In a case where no Touch-Up is detected, the process proceeds to S212.

Figure 5F:
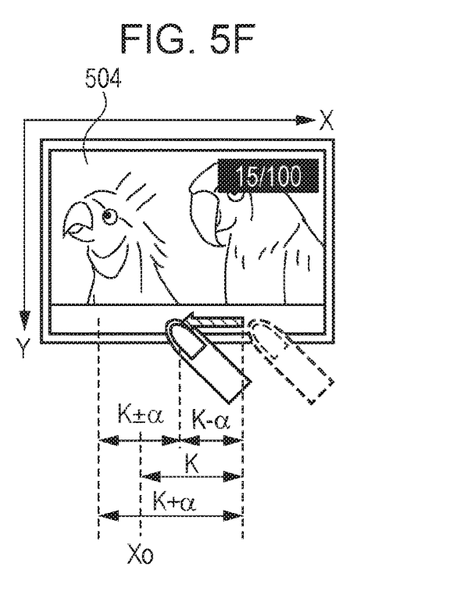
FIG. 5F is a diagram illustrating an example of display at the display unit according to the exemplary embodiment.

In S205, the system control unit 50 hides the GUI bar 520 displayed in S105. The process proceeds to S206. Then, in S206, the system control unit 50 determines whether a return flag to be described later is ON. In a case where the return flag is not ON, the process proceeds to S207. In a case where the return flag is ON, the process proceeds to S211. In S207, the system control unit 50 displays a return button. As an example, a "yes" button 507 of a selection dialog as illustrated in FIG. 5I, a "x" button 508 as illustrated in FIG. 5J, or a button 509 illustrating a thumbnail of the image displayed at the time of performance of Touch-Down and as illustrated in FIG. 5K is displayed as the return button. The shape of the return button is not limited to one of those of the buttons 507, 508, and 509. Needless to say, the design of the return button may be changed as necessary. Note that the return button may also be displayed only in a case where the return flag is ON. As described later, when the return flag is ON, it is highly likely that the user is trying to display the originally displayed image, and thus the return button may be displayed.

Next, in S208, the system control unit 50 determines whether the return button is touched within a predetermined time period after the Touch-Up. In a case where the return button is touched within the predetermined time period, the process proceeds to S211. In a case where the return button is not touched within the predetermined time period, the system control unit 50 determines in S209 whether a predetermined time period has elapsed. In a case where the predetermined time period has not elapsed, the process returns to S208 and the system control unit 50 checks whether a touch operation is performed on the return button. Note that even when the return button is not touched, yes may be obtained in S208 also in a case where, for example, a selection is made using the directional keys 141 to 144 and the SET button 145. In addition, the predetermined time period in this case is, for example, a time period of two or three seconds. In a case where the user decides to return to the previous image after checking the image displayed after image switching (image jump feed) performed as a result of the Touch-Move performed on the GUI bar 520, the user can easily display the previous image, which is the image displayed before performance of the image jump feed, by touching the return button. In addition, in a case where the user wants to compare the images before and after the image jump feed, if the switching between the images is performed by Touch-Move to display the other image, it is not easy for the user to thoroughly compare the images, which are comparison targets. However, if the switching of display can be performed promptly, it becomes easier for the user to compare the two images.

In contrast, in a case where the predetermined time period has elapsed with the return button untouched or in a case where a touch operation is performed on "no" button in the case of the selection dialog illustrated in FIG. 5I, in S210, the system control unit 50 keeps displaying the nK-th image displayed in S203. In this case, the return button is hidden.

In a case where the return flag is ON and in a case where a touch operation is performed on the return button, the system control unit 50 displays in S211, on the basis of the information regarding the image stored in S106, the image (FIG. 5A) displayed at the time of performance of the Touch-Down. The process then returns to the processing illustrated in FIG. 3. In this manner, control is performed such that the return button is displayed upon detection of Touch-Up and the previous image, that is, the image displayed at the time of performance of the Touch-Down is displayed in a case where the return button is operated within the predetermined time period. As a result, after a touch is started, not only jump to the previous image can be promptly performed and the target image can be checked, but also the state of display can be easily returned to the state at the time of execution of the Touch-Down. In S211, the information regarding the image displayed at the time of initiating a touch in the region of the GUI bar 520 and recorded in the memory 32 in S106 may be deleted. Alternatively, in S106, if information regarding an image remains in the memory 32, the information may be deleted.

Note that, in the above-described example, the return button is displayed in a case where the return flag is OFF; however, the return button may be displayed in a case where the return flag is ON. In that case, the user's intent can be reflected in display more accurately.

In a case where no Touch-Up is detected in S204, the system control unit 50 determines in S212 whether Touch-Move has been performed in a direction opposite to the direction of the Touch-Move detected last time. In a case where the Touch-Move determined in S201 is Touch-Move performed in the X-axis plus direction, it is determined in S212 whether Touch-Move has been performed in the X-axis minus direction. As illustrated in FIG. 5F, in a case where Touch-Move is performed in the X-axis minus direction and the user is moving the touch position in the direction in which originally displayed images are present, it is likely that the user has performed Touch-Move to display the previous image. Thus, in S212, in a case where Touch-Move is performed in a direction opposite to the direction of the Touch-Move detected last time, the process proceeds to S213. Otherwise, the process proceeds to S217.

Figure 5G:
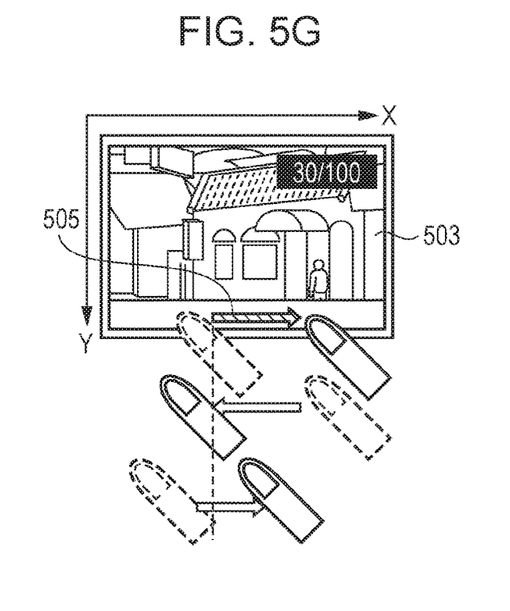
FIG. 5G is a diagram illustrating an example of display at the display unit according to the exemplary embodiment.

In S213, as illustrated in FIG. 5G, the system control unit 50 determines, on the basis of reciprocating movements in the Touch-Move, whether the user has overshot the position indicating the previous image two times or more. In a case where the user has overshot the position indicating the previous image two times or more, the process proceeds to S215. If the user has overshot the position indicating the previous image two times or more, it is highly likely that the user is trying to adjust the touch position in order to display the previous image. In a case where the user hasn't overshot the position indicating the previous image two times or more, the process proceeds to S214. In S214, the system control unit 50 determines whether the amount of movement K after the reciprocating movements is within ±α from the Touch-Down position. In this case, in a case where the user's touch position has been moved K±α in the opposite direction from the endpoint of the amount of movement K done last time, the amount of movement after the reciprocating movements is ±α from the Touch-Down position. In this case, α is a small value (distance) such as one tenth or one twentieth of the amount of movement K. That is, if the user is trying to touch the position that is ±α from the Touch-Down position, it is highly likely that the user is trying to match the touch position to the position indicating the previous image. In a case where the amount of movement K after the reciprocating movements is within ±α from the Touch-Down position, the process proceeds to S215. Otherwise, the process proceeds to S216. In S215, the return flag is turned ON, and then the process returns to S201. In S216, the return flag is turned OFF, and then the process returns to S201.

In this manner, the return flag is turned ON in a case where the user is performing a touch operation from which it is conceivable that the user is trying to move the touch position to the position indicating the previous image. As a result, after a touch is started, not only jump to the image located a few images after or before the currently displayed image can be promptly performed and the image can be checked, but also the state of display can be easily returned to the state before the start of the touch.

Figure 5H:
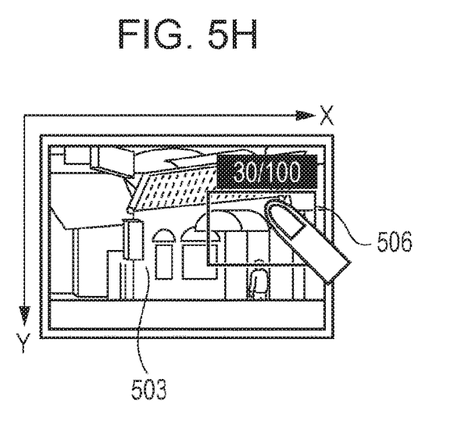
FIG. 5H is a diagram illustrating an example of display at the display unit according to the exemplary embodiment.
Figure 5I:
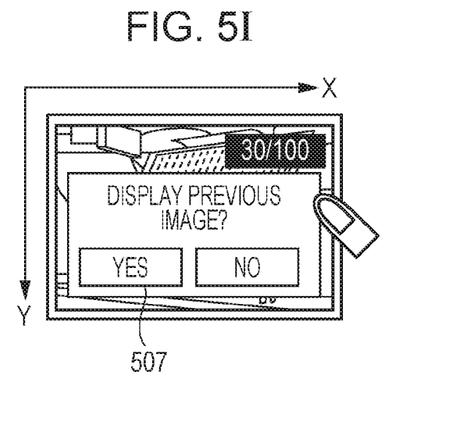
FIG. 5I is a diagram illustrating an example of display at the display unit according to the exemplary embodiment.
Figure 5J:
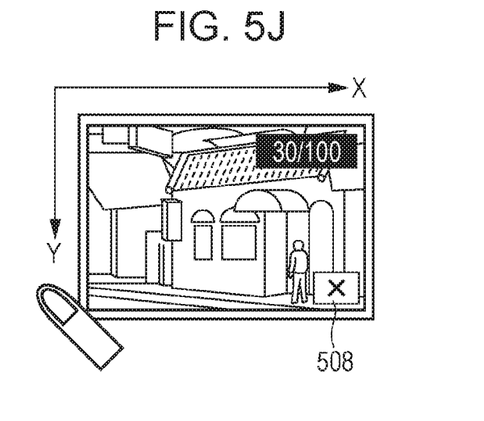
FIG. 5J is a diagram illustrating an example of display at the display unit according to the exemplary embodiment.
Figure 5K:
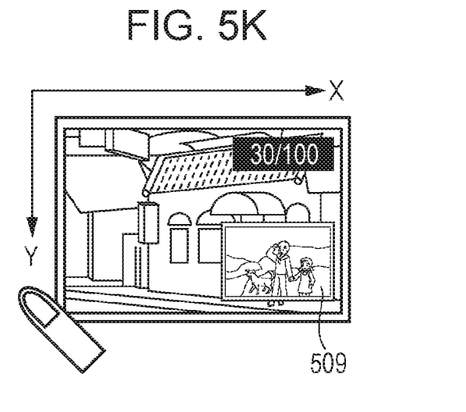
FIG. 5K is a diagram illustrating an example of display at the display unit according to the exemplary embodiment.

In contrast, in a case where no Touch-Move is performed in the opposite direction, the system control unit 50 determines in S217 whether, as a result of the Touch-Move, the touch position is moved into a predetermined region 506 in the Y-axis direction (vertical direction) (FIG. 5H). In a case where the touch position is moved into the predetermined region 506, the process proceeds to S220 and the return flag is turned ON. The process then returns to S201.

Figure 5L:
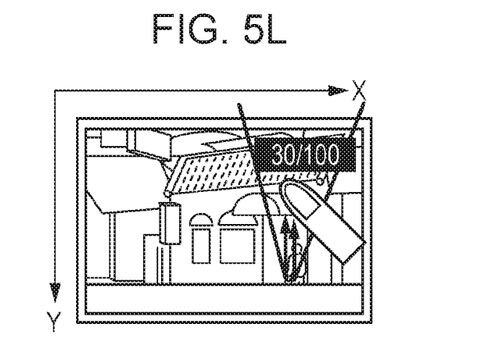
FIG. 5L is a diagram illustrating an example of display at the display unit according to the exemplary embodiment.

Note that, as illustrated in FIG. 5L, in a case where the touch position is not moved from the GUI bar 520 into the predetermined region 506 in the Y-axis direction but is moved from the GUI bar 520 into a range of a predetermined angle in the Y-axis direction (vertical direction), control may be performed such that the return flag is turned ON. This is because it is difficult to move the touch position in the Y-axis direction without moving the touch position in the X-axis direction, and thus, for example, if the touch position is moved within, for example, ±5 degrees with respect to the Y-axis direction, it is highly likely that the user is trying to perform Touch-Move straight along the Y-axis direction. Thus, in a case where the touch position is moved within the range of the predetermined angle with respect to the Y axis, yes is obtained in S217.

In this manner, the return flag is turned ON in a case where the path of Touch-Move immediately before Touch-Up is in the vertical direction. As a result, after a touch is started, not only jump to the image located a few images after or before the currently displayed image can be promptly performed and the target image can be checked, but also the state of display can be easily returned to the state before the start of the touch.

In a case where the touch position is not moved into the predetermined region 506 in the Y-axis direction, it is determined in S218 whether the touch position is stopped on the GUI bar 520 for at least a predetermined time period. In a case where the touch position is stopped on the GUI bar 520 for at least the predetermined time period, the return flag is turned ON and the process returns to S201. Otherwise, the process proceeds to S219. In this case, the predetermined time period is, for example, a time period of three or four seconds. In a case where the touch position is stopped moving on the GUI bar 520 for at least the predetermined time period, it is highly likely that the user is wondering whether the post-switching image is a desired image while checking the post-switching image or the user looks at the post-switching image and keeps touching the GUI bar 520 until he or she finishes checking the post-switching image. Thus, in a case where the predetermined time period has elapsed while the GUI bar 520 is being touched, it is highly likely that the user does not want to keep displaying the post-switching image. Thus, the return flag is turned ON.

In S219, it is determined whether a flick operation is performed in the opposite direction (a flick in a direction toward the touch-operation start position). In a case where no flick operation is performed in the opposite direction, the process proceeds to S221 and the return flag is turned OFF. The process then returns to S201. In a case where a flick operation is performed in the opposite direction, the process proceeds to S222 and the system control unit 50 displays, on the basis of the information regarding the image stored in S106, the image (FIG. 5A) displayed at the time of performance of the Touch-Down. The process then returns to the processing illustrated in FIG. 3.

As described above, according to a first exemplary embodiment, after image switching is performed in accordance with the amount of movement of a touch position after a touch is started on a predetermined region, the image displayed at the time of initiating the touch can be easily displayed even without performance of Touch-Move to the position indicating the image displayed at the time of initiating the touch. Thus, after performing Touch-Move on the GUI bar 520 to switch to and display an image that is apart from the currently displayed image in display order, the user can easily display the previous image, thereby improving operability for users. In one-image feed, an operation to compare images before and after image switching and an operation to return to the image that is previously displayed can be easily performed by performing Touch-Move at least a predetermined distance. However, in a case where image switching is performed in accordance with movement of a touch position, the touch position needs to be moved precisely to the position corresponding to the previous image since a different image is displayed if the touch position becomes separated, even a little, from the previous image. Since this operation requires fine adjustments of the touch position, it may take time and the operation needs to be performed carefully; however, according to the above-described exemplary embodiment, the user can quickly return to the previous image.

Figure 3:
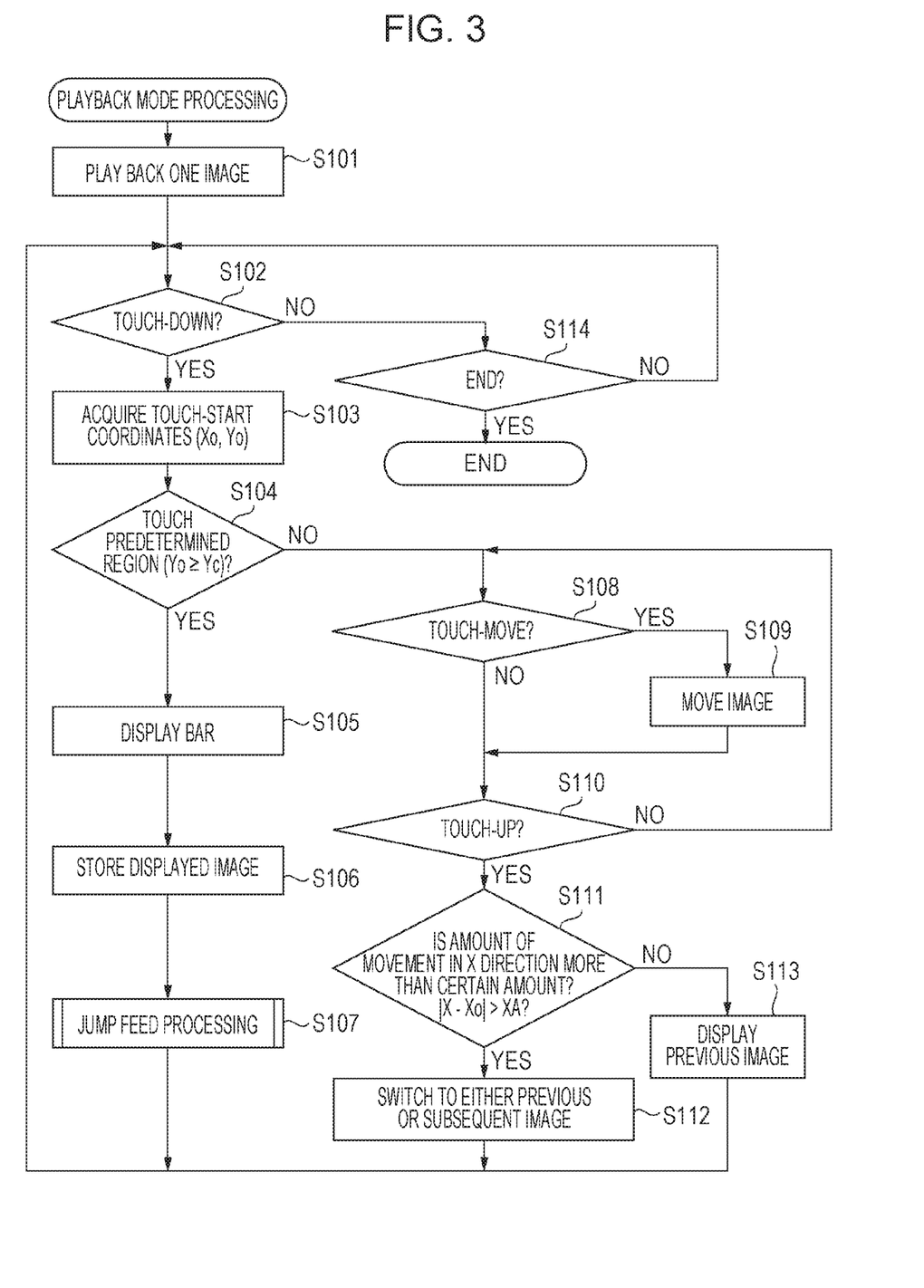
FIG. 3 is a flow chart illustrating processing performed in a playback mode according to the exemplary embodiment.

Note that, it is described in S106 in FIG. 3 that the information regarding the image displayed at the time of performance of Touch-Down is stored; however, for example, a thumbnail image of the image displayed at the time of performance of a touch start operation may be displayed at, for example, a Touch-Down position on the GUI bar 520. In this way, in a case where thereafter returning back to the previous image is performed while the touch is being continued after the image located a few images after or before the current image is displayed by performing Touch-Move, it becomes easier to understand roughly where on the GUI bar 520 the previous image is present. That is, it becomes easier to intuitively understand how much backward movement is necessary through Touch-Move to display the image, and thus the state of display can be easily returned to the state before the start of the touch.

In addition, the image located a few images after or before the image displayed at the time of performance of the Touch-Down is displayed on the basis of the amount of movement K in S203; however, simultaneously with this processing, information regarding the image displayed at the time of performance of the Touch-Down (for example, an image number) may be displayed at an arbitrary position on the display unit 28. In this way, in a case where the user thereafter tries to return to the image displayed at the time of performance of the Touch-Down, the user can estimate roughly to where in images he or she needs to return, and thus there is an advantage in that the state of display can be easily returned to the state before the start of the touch.

Figure 5M:
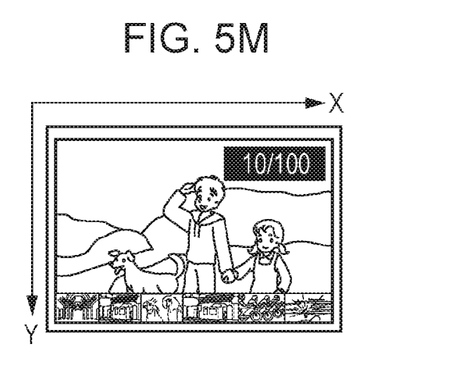
FIG. 5M is a diagram illustrating an example of display at the display unit according to the exemplary embodiment.

In addition, in the above-described example, no image is displayed on the GUI bar 520; however, as illustrated in FIG. 5M, a thumbnail image of the currently displayed image may be displayed at the position where a touch is performed, and thumbnail images of images before and after the currently displayed image may be displayed in both directions along the X axis.

Note that, in the above-described exemplary embodiment, the example has been described in which image switching is performed by performing a touch operation on the touch panel 70a; however, image switching is not limited to this and may be performed by, for example, performing a gesture operation or an operation for specifying (inputting) a position using a commanding member using, for example, infrared light. That is, a displayed image is switched to another by starting position specification on the operation surface and moving the specified position by performing a gesture operation or using the commanding member using, for example, infrared light. In this case, even when the specified position is not moved to the position that is initially specified, which is hereinafter referred to as an initial specification position, if the specified position reciprocates over the initial specification position two times or more (corresponding to S213) or an operation for specifying somewhere near the initial specification position is performed (corresponding to S214), the return flag is turned ON. In addition, also in a case where the specified position is moved in the vertical direction (corresponding to S217), a case where the specified position is fixed for at least a predetermined time period (corresponding to S218), and a case where an operation for quickly moving the specified position to the initial specification position direction is performed (corresponding to S219), the return flag is turned ON. After the return flag is turned ON, it may be determined in accordance with cancellation (release) of the operation for position specification on the operation surface (corresponding to S204) whether the return flag is ON, and the previous image may be displayed.

Furthermore, in the above-described exemplary embodiment, it has been described that the position at which a touch is started is not associated with an image to be selected and the image that is before (or after) the displayed image by an amount corresponding to the amount of movement of a touch is displayed; however, the following may also be performed. That is, a touch position may be associated with one of the images by associating positions set from one end to the other end (a predetermined length) of the GUI bar 520 with the first to the last images. In this way, the user can quickly display a desired image by changing the position at which the user starts a touch depending on roughly which position in all the images the user wants to specify such as somewhere in the middle or the latter part. In addition, the positions set from the one end to the other of the GUI bar 520 do not have to be associated with images and may be associated with frames of the entire moving image or with playback positions of a tune to be played back.

In addition, the number of conditions under which the above-described return flag is turned ON does not have to be one, and the return flag may be turned ON in a case where a combination of conditions is satisfied. For example, in a case where yes is obtained in S218 and thereafter yes is obtained in S213, the return flag may be turned ON.

In the above-described exemplary embodiment, the example has been described in which the present invention is applied to a digital camera; however, the present invention is not limited to this example and can be applied to a display control apparatus capable of switching an image to be displayed. That is, the present invention can be applied to electronic devices such as a personal computer, a personal digital assistant (PDA), a portable phone terminal, a portable image viewer, a printer device with a display, a digital photo frame, a music player, a game machine, and an e-book reader. In that case, an image displayed on a display unit is an image associated with a piece of content handled by a corresponding electronic device. In addition, the touch panel does not have to be formed integrally with the display unit, and the above-described exemplary embodiment can also be applied in a case where, while looking at a display unit, the user performs a touch operation on a touch panel such as a touch pad that displays images and that is separated from the display unit.

In a case where a program that realizes at least one function of the above-described exemplary embodiment is supplied to a system or an apparatus via a network or a storage medium, the present invention can also be realized by performing processing in which at least one processor in the system or apparatus reads out and executes the program. In addition, the present invention can also be realized by a circuit that realizes at least one function of the above-described exemplary embodiment (for example, an application-specific integrated circuit (ASIC)).

According to the present invention, the operability of a display control apparatus at the time of switching an image to be displayed can be improved by moving an input position through an operation performed on an operation surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display control apparatus comprising:
at least one memory and at least one processor which function as:
a detection unit configured to detect an input operation for inputting a position; and
a control unit configured to perform control to switch an image to be displayed on a display unit in accordance with an amount of movement of an input position based on an input operation detected by the detection unit,
wherein the control unit is configured to perform control to
switch an image to be displayed on the display unit to a second image in a case where a first image is displayed on the display unit, an input position is started from a first position, and the input position is moved a first amount in a first direction,
switch the image to be displayed on the display unit to a third image, which is further than the second image, in a case where the first image is displayed on the display unit, an input position is started from the first position, and the input position is moved a second amount, which is larger than the first amount, in the first direction,
display, in a state in which the third image is displayed, a predetermined item on the display unit in accordance with a predetermined operation based on the input operation, by which the third image is displayed and which is started from the first position, and
switch the image to be displayed on the display unit from the third image to the first image in accordance with selection of the predetermined item in a state in which the third image and the predetermined item are displayed,
wherein the control unit is configured to perform control to display the predetermined item on the display unit in a case where, in the state in which the third image is displayed, a position input, which satisfies a predetermined condition, is performed without cancellation of the input operation, by which the third image is displayed and which is moved the second amount from the first position, and not to display the predetermined item in a case where the predetermined operation is performed but a position input, which satisfies the predetermined condition, is not performed.

2. The display control apparatus according to claim 1, wherein the control unit is configured to perform control to display the first image on the display unit in accordance with, in the state in which the third image is displayed, movement of the input position to the first position without cancellation of the input operation, by which the third image is displayed and which is moved the second amount from the first position.

3. The display control apparatus according to claim 1, wherein the predetermined operation is cancellation of the input operation, and the control unit is configured to perform control to display the predetermined item in accordance with cancellation of the input operation in the state in which the third image is displayed, and hide the predetermined item in accordance with a lapse of a predetermined time period.

4. The display control apparatus according to claim 1, wherein the predetermined item is a thumbnail image indicating the first image.

5. The display control apparatus according to claim 1, wherein the predetermined item is an item indicating cancellation of display of the third image.

6. The display control apparatus according to claim 1, wherein the control unit is configured to perform control to display, together with the predetermined item, guidance indicating switching of the image to be displayed on the display unit from the third image to the first image.

7. The display control apparatus according to claim 1, wherein the predetermined condition is that a movement in which the first position is overshot by the input operation is made two times or more.

8. The display control apparatus according to claim 1, wherein the predetermined condition is that the input position is moved from the first position into a predetermined range, and the input operation is cancelled in the predetermined range.

9. The display control apparatus according to claim 1, wherein the predetermined condition is that the input operation is cancelled without moving the input position after a position input to the same position is continued by the input operation over a predetermined time period in the state in which the third image is displayed.

10. The display control apparatus according to claim 1, wherein the predetermined condition is that the input operation is cancelled by quickly moving the input position in the first position from the input position in the case where the third image is displayed.

11. The display control apparatus according to claim 1, wherein the predetermined condition is that the input operation is cancelled after the input position is moved into a region located in a direction perpendicular to the first direction from the input position in the case where the third image is displayed.

12. The display control apparatus according to claim 1, wherein the detection unit is configured to detect, as the input operation, a touch operation performed on a touch panel.

13. The display control apparatus according to claim 1, wherein the at least one memory and at least one processor further function as:
a recording unit configured to record information indicating an image displayed on the display unit in a case where movement of an input position based on an input operation which is a cause of image switching performed by the control unit is started, wherein the control unit is configured to perform control to retain the information indicating the image at least until the input operation is cancelled.

14. The display control apparatus according to claim 1, wherein the control unit is configured to perform control to switch to the previous image or next image in accordance with movement of an input position and regardless of the amount of movement in a case where the first image is displayed on the display unit and an input position is started in a second region along the first direction and different from a first region including the first position, and to switch the image to be displayed on the display unit from the first image to an image next to the first image also in a case where the input position is moved the second amount in the first direction.

15. A control method for a display control apparatus comprising:
detecting an input operation for inputting a position; and
performing control to switch an image to be displayed on a display unit in accordance with an amount of movement of an input position based on an input operation detected in the detecting, wherein in the performing an image to be displayed on the display unit is switched to a second image in a case where a first image is displayed on the display unit, an input position is started from a first position, and the input position is moved a first amount in a first direction,
the image to be displayed on the display unit is switched to a third image, which is further than the second image, in a case where the first image is displayed on the display unit, an input position is started from the first position, and the input position is moved a second amount, which is larger than the first amount, in the first direction,
in a state in which the third image is displayed, a predetermined item is displayed on the display unit in accordance with a predetermined operation based on the input operation, by which the third image is displayed and which is started from the first position, and
the image to be displayed on the display unit is switched from the third image to the first image in accordance with selection of the predetermined item in a state in which the third image and the predetermined item are displayed,
wherein the performing controls to display the predetermined item on the display unit in a case where, in the state in which the third image is displayed, a position input, which satisfies a predetermined condition, is performed without cancellation of the input operation, by which the third image is displayed and which is moved the second amount from the first position, and not to display the predetermined item in a case where the predetermined operation is performed but a position input, which satisfies the predetermined condition, is not performed.

* * * * *